Feb. 22, 1955 — E. J. MAATMAN — 2,702,512
SNUBBED TRUCK
Filed May 20, 1950 — 2 Sheets-Sheet 2
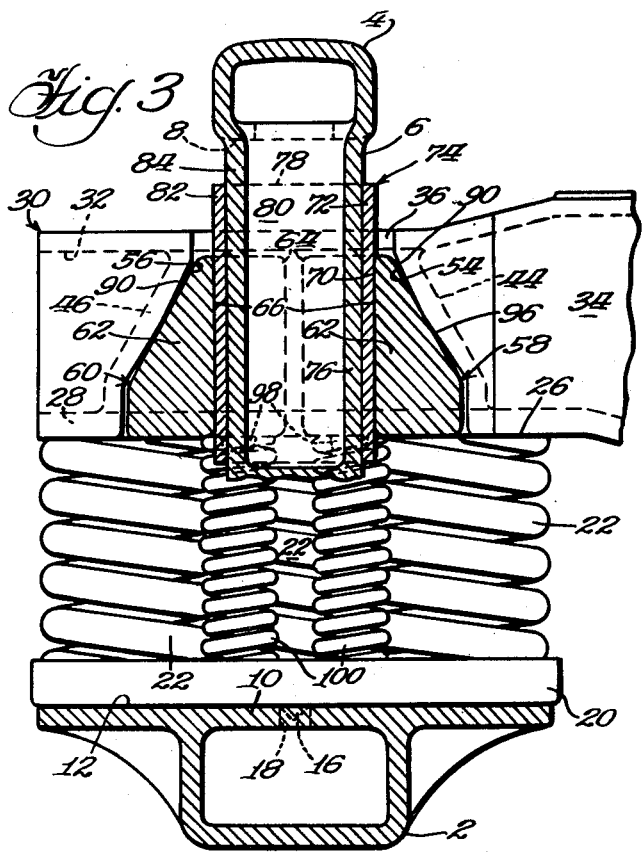
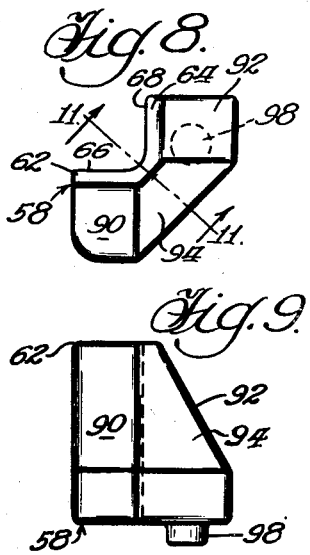
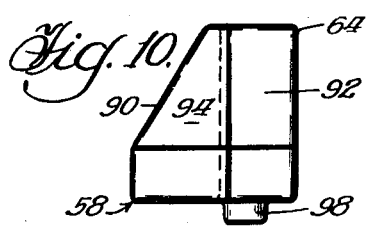
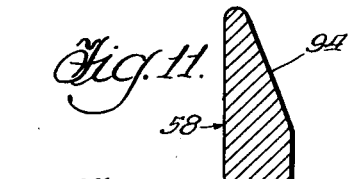
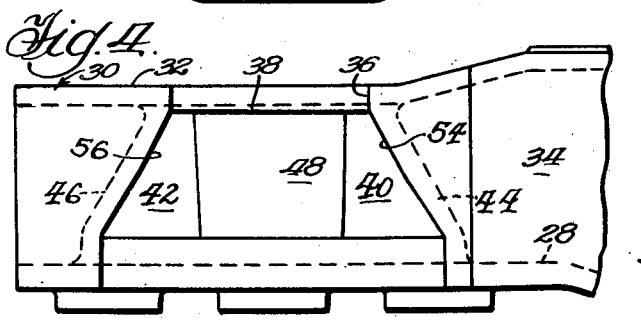
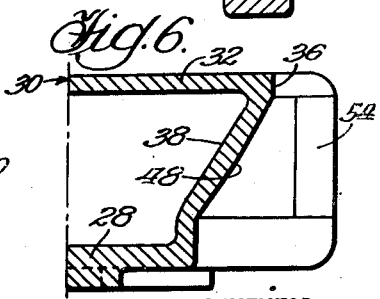
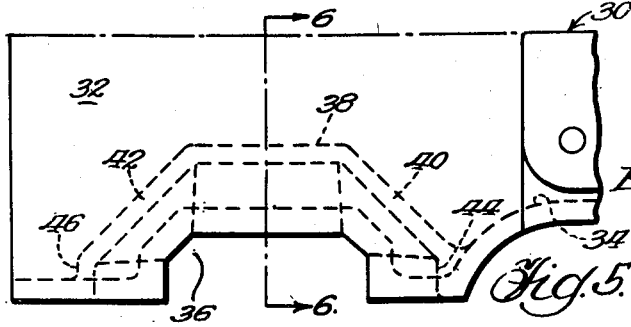
INVENTOR.
Egbert J. Maatman
BY

United States Patent Office 2,702,512
Patented Feb. 22, 1955

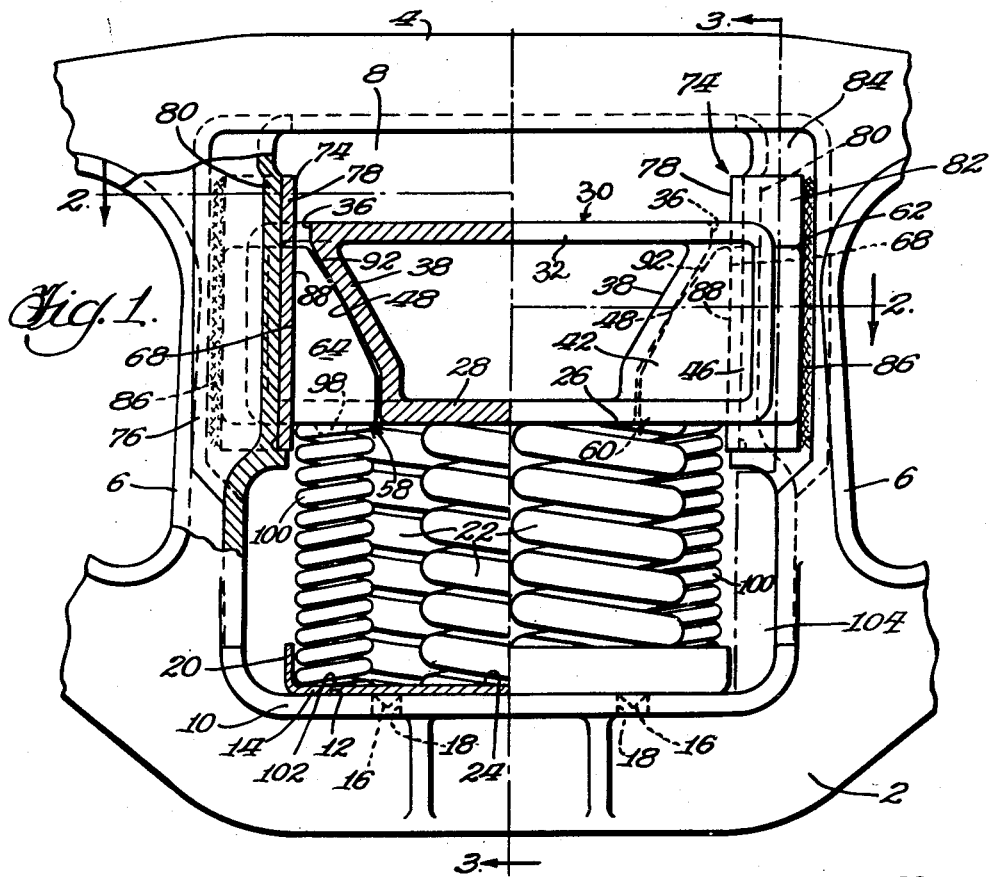

2,702,512
SNUBBED TRUCK

Egbert J. Maatman, South Holland, Ill., assignor to American Steel Foundries, Chicago, Ill., a corporation of New Jersey Application May 20, 1950, Serial No. 163,181

16 Claims. (Cl. 105—197)

This invention relates to railway car trucks and more particularly to a novel truck incorporating snubbing means of novel form for controlling relative movements between the bolster and the side frames of the truck.

A general object of the invention is to provide a truck wherein the snubbing means are arranged to act between the bolster and external surfaces of the side frames longitudinally and laterally of the truck.

Another object of the invention is to provide a truck incorporating snubbing means formed and arranged to provide a simple bolster structure and column construction on the side frames.

A more specific object of the invention is to provide a truck having a bolster interposed between spaced columns of a side frame, the bolster having wedge engagement along a plurality of angularly related surfaces with inboard and outboard friction shoes engaging external inboard and outboard sides of an associated column and also an adjacent side of the column extending transversely of the truck.

A further object of the invention is to provide in a truck of the type described a snubbing arrangement which will not encroach on the available spring space whereby spring capacity is maintained.

A different object of the invention is to provide such a truck wherein the columns of the side frames are of simple design formed to provide the necessary strength to withstand the loads imposed thereagainst in service.

A further object of the invention is to arrange the friction shoes of the snubbing means to yieldingly interlock the bolster with the side frame.

Another object of the invention is to provide friction means which are easy to assemble and disassemble.

These and other objects of the invention will become more apparent from the specification and drawings, wherein:

Figure 1 is a fragmentary side elevational view partly in vertical section of a railway car truck incorporating the invention, the section being taken substantially on the line 1—1 of Figure 2;

Figure 2 is a horizontal cross sectional view, taken substantially on the line 2—2 of Figure 1;

Figure 3 is a transverse vertical sectional view, taken substantially on the line 3—3 of Figure 1;

Figure 4 is a fragmentary side elevational view of the bolster, taken from the right, as seen in Figure 1;

Figure 5 is a fragmentary top plan view of Figure 4;

Figure 6 is a fragmentary vertical cross sectional view of the bolster, taken substantially on the line 6—6 of Figure 5;

Figure 7 is a vertical sectional view, taken substantially on the line 7—7 of Figure 2;

Figure 8 is a top plan view of one of the friction shoes;

Figure 9 is a side elevational view of the shoe taken from the bottom as seen in Figure 8;

Figure 10 is a rear view taken from the right side of Figure 8; and

Figure 11 is a vertical cross sectional view, taken substantially on the line 11—11 of Figure 8.

Describing the invention in detail, the railway car truck comprises a side frame having tension and compression members 2 and 4 and spaced columns 6, 6 interconnecting the tension and compression members and defining a central bolster opening 8 in the frame.

The tension member comprises a widened top chord or web 10 at the bottom of the bolster opening, affording a seat 12 for a spring container comprising a plate 14 which is interlocked with web 10 by a plurality of depending bosses 16, 16, entering aligned openings 18, 18 in web 10. The plate 14 is formed with an upstanding peripheral flange 20 therearound.

A plurality of load-carrying springs 22, 22 are seated as at 24 at their lower ends on the plate 14 and confined in the container by the flange 20. It will be noted that the springs are arranged in conventional manner with two sets of springs disposed at the inboard side of the seat and two at the outboard side and one centrally between the inboard and outboard sets. The upper ends of the springs 22 seat as at 26 against a bottom wall 28 of a bolster, generally indicated 30.

The bolster 30 extends at each end into the bolster opening 8 of an associated frame. The bolster is a box-section member and, in addition to the bottom wall 28, comprises a top wall 32 and a side wall 34 at each side thereof interconnecting the top and bottom walls.

The bolster comprises a pyramid-like pocket 36 at each side thereof. Each pocket comprises a rear wall 38, which slopes upwardly toward the adjacent side of the bolster. The wall 38 extends longitudinally of the bolster and is connected at its inboard and outboard ends to the inner ends of inboard and outboard walls 40 and 42. The walls 40 and 42 diverge in a direction away from wall 38 toward the adjacent side of the bolster and are disposed inboardly and outboardly of the adjacent side frame column 6 and slope upwardly thereto. The outer ends of the walls 40 and 42 are respectively connected to facing inboard and outboard webs 44 and 46, which are disposed inboardly and outboardly in alignment with the adjacent column 6 transversely of the frame. The webs 44 and 46 extend longitudinally of the frame and converge upwardly toward the adjacent column. The walls 38, 40, 42 and the webs 44 and 46 are connected at their upper and lower edges to the top and bottom walls 32 and 28 of the bolster.

The wall 38 provides a downwardly facing, upwardly sloping, crowned wedge surface 48. Downwardly facing, upwardly sloping, crowned wedge surfaces 54 and 56 are provided on webs 44 and 46. Preferably the walls 38, 40, and 38, 42 are arranged at approximately 135 degrees, and the walls 40, 44, and 42, 46 are arranged at 135 degrees. It will be noted, that the portions of the bolster, which are provided with the walls 44 and 46, overlap the adjacent column transversely of the frame.

Each pocket contains a pair of shoes 58 and 60, said shoes having the form of a quadrant of a pyramid with a hollow portion extending therethrough. Each shoe is somewhat V-shaped in top plan and comprises two angularly related interconnected legs or portions 62 and 64 which are disposed substantially at right angles to each other. The legs 62 and 64 present substantially vertical friction faces 66 and 68 on their forward or outer sides. The face 66 of the inboard shoe 58 at the right and of shoe 60 at the left engages a generally vertical inboardly facing, substantially flat friction surface 70 on the inboard side of the associated column 6.

The surface 70 extends longitudinally of the truck or side frame and is formed on an inboard leg 72 of a U-shaped friction plate 74. The inboard leg seats against an inboard wall 76 of the associated column. The friction plate comprises a transverse section or segment 78 with seats against a transverse wall 80 of the associated column. The transverse segment 78 is connected to an outboard leg 82 of the friction plate, said outboard leg seating against an outboard wall 84 of the associated column 6. The friction plate 74 is connected to the related column in any convenient manner, preferably as by welding the outer ends of legs 72 and 82 as at 86, 86. It will be noted that the inboard and outboard walls of each column are offset toward each other adjacent the bolster opening, to decrease the lateral extent of the column in order not to unduly increase the width thereof and to conveniently accommodate the friction plates 74.

The surface 68 of each inboard shoe engages a generally vertical surface 88 on the transverse portion 78 of the associated friction plate 74. The legs 62 and 64 of each shoe comprise upwardly sloping plane and rectangular wedge surfaces 90 and 92 on the reverse or rear sides, said surfaces being related at substantially 90 degrees to each other and converging upwardly. Between the surfaces 90 and 92, at the juncture of the legs 62 and 64, each shoe has a plane quadrilateral surface 94 which merges with wedge surfaces 90 and 92. The inboard shoe 58 at the right side, as shown in the drawings, has its surface 90 in wedge engagement as at 96 with the wedge surface 54 of the web 44 and the surface 92 is in wedge engagement with the surface 48. The outboard shoe at the right has its surfaces 90 and 92 in wedge engagement with surfaces 56 and 48, respectively. Similarly, the inboard shoe 60 at the left, as shown in the drawings, has its surfaces 90 and 92 in wedge engagement with the related surfaces 54 and 48, respectively, and the outboard shoe at the left has its surfaces 90 and 92 in wedge engagement with the associated surfaces 56 and 48.

The leg 64 of each shoe is provided on the bottom thereof with a boss 98, which positions the upper end of an associated vertical coil spring 100, the lower end of which seats as at 102 on the top side of plate 14 of the spring container.

It will be noted that, as the bolster descends, each shoe is urged simultaneously transversely and longitudinally and along a component of these two against an external surface of the frame extending longitudinally of the frame and another surface extending transversely of the frame. It will be understood that the surfaces 92 and 90 could be continued and merge with each other or that each shoe may engage at 94 the related web 40 or 42. However, the illustrated construction is preferred inasmuch as it does not require deepening of the friction shoe pockets with consequent weakening of the bolster. Furthermore, the size of the shoes is greatly reduced and a positive bearing along all of the wedge surfaces is obtained.

To disassemble the truck, the bolster is elevated to the top of the bolster opening. The spring container and springs 22 and 100, 100 are removed from beneath the bolster and the shoes, whereupon the shoes are permitted to drop out of the bolster through cored out openings in the bottom wall 28 of the bolster. The shoes are then removed. The bolster is lowered to the lower end of the bolster opening and is withdrawn beneath the upper bolster guide portions of the columns through a widened lower end 104 of the bolster opening. The bolster is reassembled with the frame in reverse order.

I claim:

1. In a railway car truck, a side frame comprising tension and compression members and spaced columns defining a bolster opening, a bolster spring-supported from the frame, each column presenting external inboard and outboard friction surfaces extending longitudinally of the frame and a friction face extending transversely of the frame, said bolster having pockets adjacent each column, inboard and outboard friction shoes in each pocket embracing the adjacent column therebetween and in wedge engagement with the bolster, the inboard shoe frictionally engaging the inboard surface and said face of the associated column, and the outboard shoe engaging said face and the outboard surface of the associated column, and a vertical spring compressed between each shoe and said tension member for urging the shoe into said engagement.

2. In a railway car truck, a side frame comprising spaced columns, a bolster spring-supported from the frame between the columns, said columns having inboard and outboard external friction surfaces extending longitudinally of the frame and a friction face extending transversely of the frame, a pair of inboard and outboard shoes at each side of the bolster in wedge engagement therewith, said inboard shoe having a portion engaging the inboard surface and having another portion engaging said face, said outboard shoe having a portion engaging said outboard surface and having another portion engaging said face, and spring means oriented to urge said shoes into said engagement.

3. A bolster comprising top and bottom walls and spaced side walls with pockets therein, each pocket being defined by an upwardly sloping web extending longitudinally of the bolster, inboard and outboard upwardly sloping webs connected to the inboard and outboard edges of said web and diverging toward the adjacent side of the bolster, and inboard and outboard upwardly sloping walls extending transversely of the bolster and connected to the outer edges of said inboard and outboard webs respectively, said webs and inboard and outboard walls being connected at their upper and lower edges with said top and bottom walls.

4. A bolster comprising a pocket in at least one side thereof for associated friction means, said pocket being defined by upwardly sloping webs, one of said webs extending longitudinally of the bolster substantially medially between the inboard and outboard extremities of the pocket at the rear thereof, other of said webs being disposed at the inboard and outboard extremities of the pocket and extending transversely of the bolster, and still other of said webs extending diagonally between said first and second-mentioned webs and interconnecting the same.

5. In a railway car truck, a side frame having a column member, a bolster member spring-supported therefrom, a friction means between said members including a spring-actuated friction shoe in frictional engagement with one member along surfaces extending longitudinally and laterally of the side frame and in wedge engagement with the other member along wedge surfaces sloping toward the respective of said first-mentioned surfaces, the surfaces on the column member being located externally thereof.

6. In a railway car truck, a frame comprising a column member, a bolster member spring-supported from the frame, spaced inboard and outboard shoes embracing the column member therebetween and having portions extending between the bolster member and the column member transversely of the frame, said shoes having wedge engagement with one of said members and slidable frictional engagement with the other of said members, and spring means reacting between each shoe and one of said members for urging the shoe into said engagement.

7. In a railway car truck, a side frame comprising spaced columns, each column presenting inboard and outboard friction surfaces extending longitudinally of the frame and a friction face extending transversely of the frame, a bolster spring-supported from the frame between said columns, the bolster having wedge surfaces adjacent each surface and face, sloping upwardly thereto and friction shoe means in wedge engagement with the bolster wedge surfaces and with the column friction surfaces and face.

8. In a railway car truck, a side frame having a column with external inboard and outboard friction surfaces which merge at corners with a transverse friction surface, a bolster movable vertically with respect to the column, a pair of spaced spring-actuated shoes wedged between the bolster and said surfaces inboardly of said column, each shoe extending around the adjacent corner of the column and having a portion engaging the transverse surface and the respective inboard or outboard surface.

9. In a railway car truck, a side frame having spaced columns, each column having external inboard and outboard friction surfaces and a transverse friction face, a bolster spring-supported between said columns and having a pocket adjacent each column, and friction means in each pocket engaging the adjacent column along said inboard and outboard surfaces and said face.

10. A railway car truck, according to claim 9, wherein said friction means comprise spring-actuated shoes, each shoe engaging one of said surfaces and said face.

11. In a railway car truck, a side frame comprising spaced columns, each presenting an external transverse friction face and external inboard and outboard friction surfaces, a bolster movably supported between said columns, and friction means acting between the bolster and columns and comprising a plurality of friction shoes embracing each column and engaging the friction surfaces and face thereof.

12. In a friction shoe of the character described having the form of a quadrant of a pyramid with a hollow portion extending therethrough; a concave friction surface presented by said portion and comprising two plane and angularly related friction surfaces; two peripheral, plane, rectangular, wedge surfaces each angularly disposed with respect to the related friction surface to form a wedge portion; and a plane quadrilateral, surface merged with said wedge surfaces.

13. In a railway car truck of the character described; the combination of a side frame having a column with inboard and transverse friction surfaces; a bolster spring-supported from the frame and having a friction shoe pocket with a rear wall and an inboard web; a friction shoe resiliently supported from the frame and having surfaces frictionally engaged with said inboard and transverse surfaces and having other surfaces wedged against said rear wall and inboard web.

14. In a railway car truck of the character described; the combination of a side frame having a column with outboard and transverse friction surfaces; a bolster spring-supported from the frame and having a friction shoe pocket with a rear wall and an outboard web; and a friction shoe resiliently supported from the frame and having surfaces frictionally engaged with said outboard and transverse surfaces and having other surfaces wedged against said rear wall and outboard web.

15. In a railway car truck of the character described; the combination of a side frame having a column with inboard, outboard, and transverse friction surfaces; a bolster spring-supported from the frame and having a pocket with a rear wall and inboard and outboard webs; an inboard friction shoe resiliently supported from the frame and having surfaces frictionally engaged with said inboard and transverse surfaces and having other surfaces wedged against said rear wall and inboard web; and an outboard friction shoe resiliently supported from the frame and having surfaces frictionally engaged with said outboard and transverse surfaces and having other surfaces wedged against said rear wall and outboard web.

16. In railway car truck of the character described; the combination of a side frame having a column with friction surfaces thereon, extending longitudinally and transversely of the frame, a bolster, spring supported from the frame, having a wedge wall thereon, said wall being located adjacent said column, said wall being arranged to extend diagonally across the bolster as seen at top plan view, and to concurrently converge on the adjacent column, a friction shoe having a surface wedged against said wall and having two friction faces in engagement with said friction surfaces, respectively, and means resiliently urging said shoe against said wall.

References Cited in the file of this patent

UNITED STATES PATENTS

| | | |
|---|---|---|
| 2,255,960 | Barrows | Sept. 16, 1941 |
| 2,317,352 | Bachman | Apr. 27, 1943 |
| 2,370,106 | Edstrom | Feb. 20, 1945 |
| 2,377,178 | Pierce | May 29, 1945 |
| 2,395,317 | Cottrell | Feb. 19, 1946 |
| 2,434,838 | Cottrell | Jan. 20, 1948 |
| 2,444,009 | Grigsby | June 22, 1948 |
| 2,446,639 | Dath | Aug. 10, 1948 |
| 2,557,768 | Schlegel | June 19, 1951 |
| 2,650,550 | Pierce | Sept. 1, 1953 |